United States Patent [19]

Lundy

[11] Patent Number: 5,269,129
[45] Date of Patent: Dec. 14, 1993

[54] CHAIN OF FIBER-REINFORCED RESIN COMPOSITE MATERIAL

[75] Inventor: Brian T. Lundy, Sandy, Utah

[73] Assignee: Aluminum Company of America, Pittsburgh, Pa.

[21] Appl. No.: 835,366

[22] Filed: Feb. 14, 1992

[51] Int. Cl.$^5$ .............................................. F16G 15/00
[52] U.S. Cl. ........................................ 59/78; 59/84; 59/901; 59/900; 474/207
[58] Field of Search .................. 59/78, 82, 83, 84, 90, 59/92, 900, 901; 474/206, 207, 208

[56] References Cited

U.S. PATENT DOCUMENTS

| | | | |
|---|---|---|---|
| 653,374 | 7/1900 | Barry | 474/206 |
| 2,185,563 | 1/1940 | Palmer | 24/33 |
| 2,675,592 | 4/1954 | Lofton | 24/33 |
| 2,884,116 | 4/1959 | Leach | 59/78 |
| 4,031,919 | 6/1977 | Ortloff et al. | 137/799 |
| 4,060,006 | 11/1977 | Abel et al. | 474/207 |
| 4,150,906 | 4/1979 | Bernard | 403/213 |
| 4,183,986 | 1/1980 | Blatterlein | 426/160 |
| 4,552,035 | 11/1985 | Skipper | 59/84 |
| 4,589,801 | 5/1986 | Salama | 405/224 |
| 4,757,681 | 7/1988 | Matsuno et al. | 59/83 |
| 4,862,926 | 9/1989 | Barrette et al. | 139/383 |

Primary Examiner—David Jones
Attorney, Agent, or Firm—Felix J. D'Ambrosio; David W. Pearce-Smith

[57] ABSTRACT

A chain formed of links made of fiber-reinforced resin composite material. Each link has a terminal loop located at each axial end of a long strap. Loops, located at adjacent ends of successive links, are joined by relatively short connecting links that overlap bushings located within each of the loops. The bushings and connecting links are held in position at each lateral side of the links by pins and washers. A ring surrounds each link where the strap flares to form each terminal loop. The loops may be unitary or spaced laterally to receive within the space a unitary loop of an adjoining link aligned axially with the other loop. A pin located within the loops supports washers at each lateral side of the links to maintain the position of the links and to transfer load between the links.

17 Claims, 2 Drawing Sheets

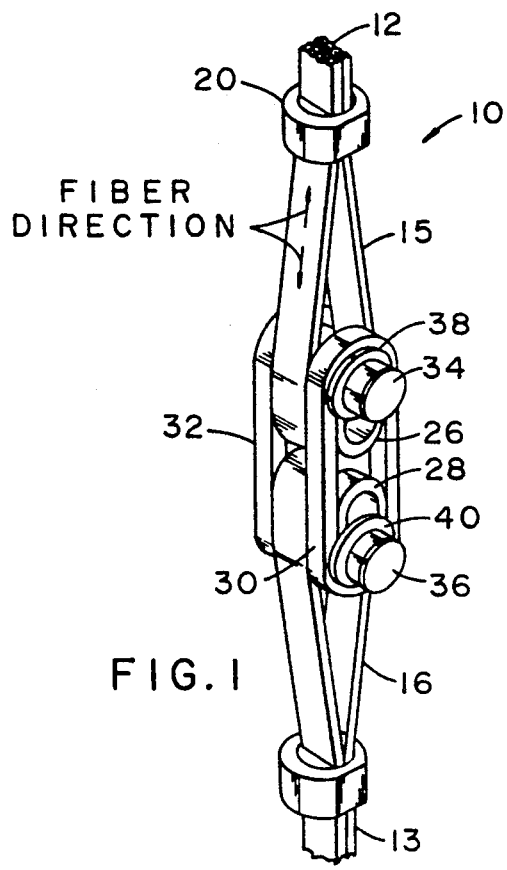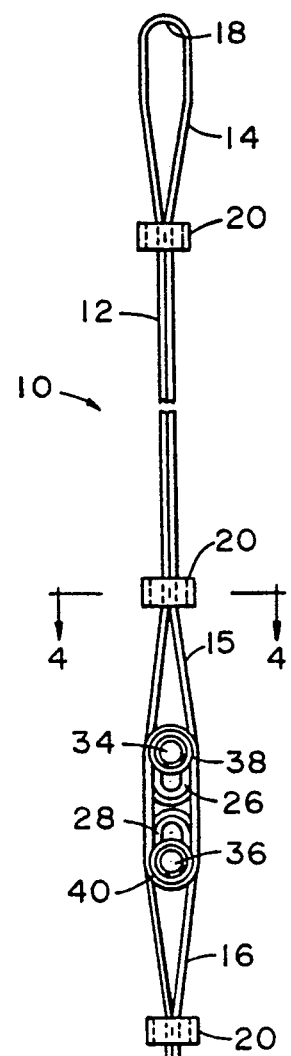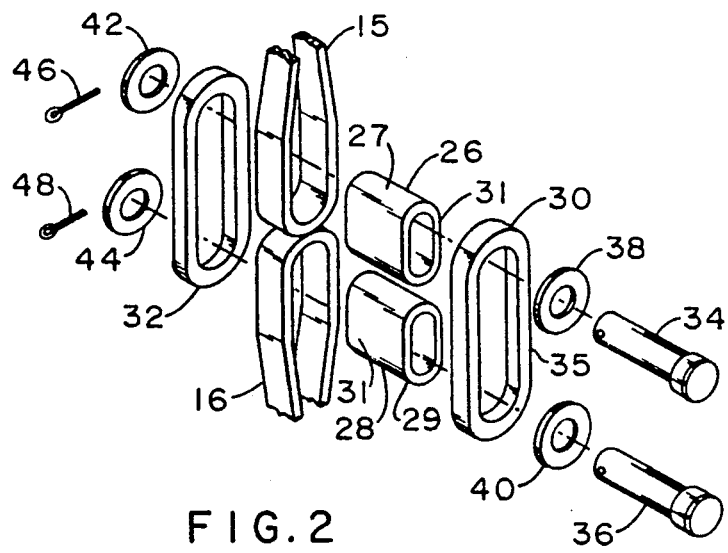

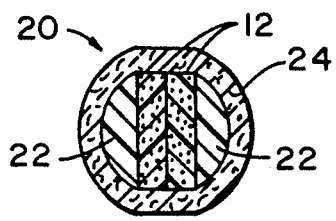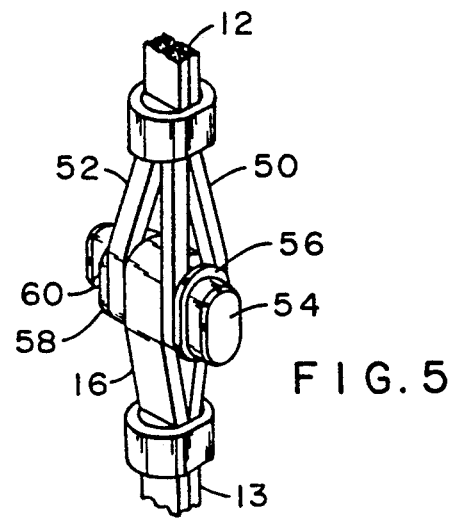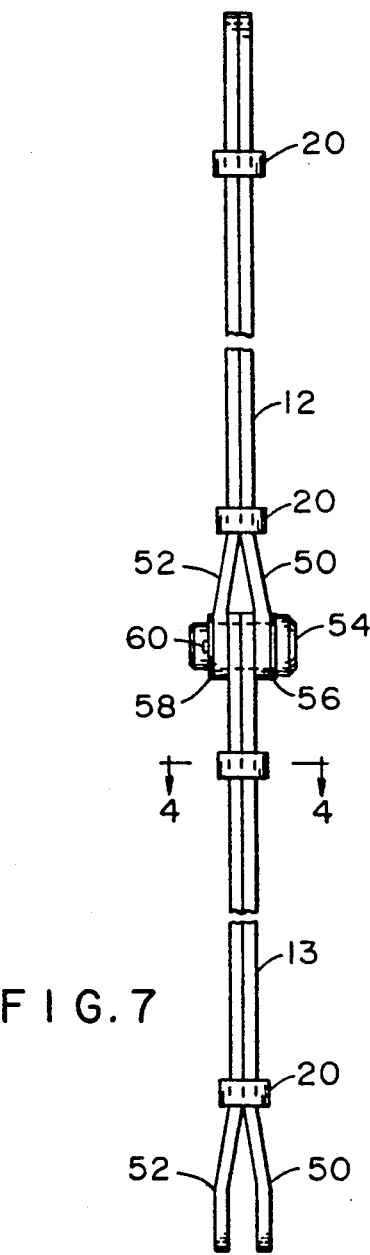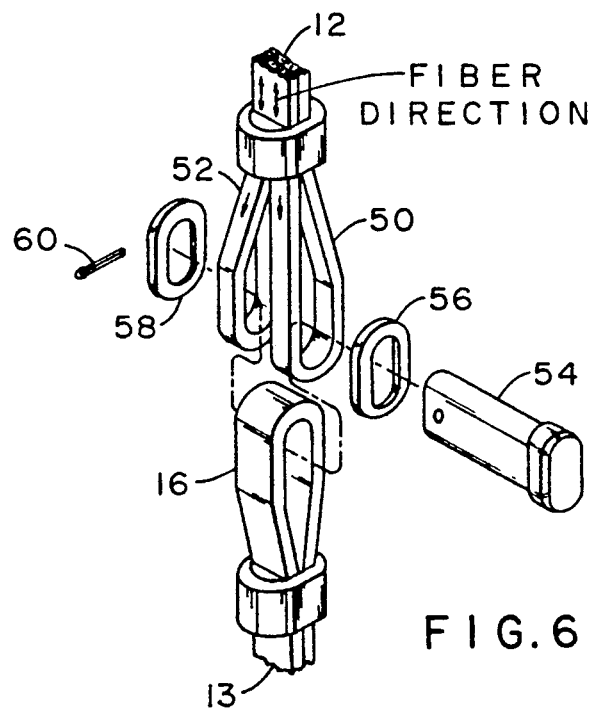

CHAIN OF FIBER-REINFORCED RESIN COMPOSITE MATERIAL

BACKGROUND OF THE INVENTION

1. Field of the Invention

This invention relates to the field of chain and chain links, especially long, high strength chin for mooring lines and tension legs used to connect offshore platforms to the sea floor. The invention pertains to such chain formed of synthetic materials, especially to a composite that includes plastic resin reinforced with high strength fibers.

2. Description of the Prior Art

Conventional mooring lines and tension legs are made from steel rope or cable having a diameter of five to six inches. In service they carry tensile loads for long periods while submerged in sea water. But the weight of steel in sea water is 92 percent of its weight in air. Therefore, due to the great size, length and weight of conventional steel cables, offshore platforms fixed to the sea floor by such cables must be larger than otherwise required so they can buoy the lines. Use of tubular cables of composite material to reduce weight of mooring lines is described in U.S. Pat. No. 4,589,801.

An articulated riser supporting multiple fluid handling lines extending between a structure on the sea bottom and a surface vessel is described in U.S. Pat. No. 4,031,919. Adjacent segments of the riser are joined mutually by a universal joint, which provides axial force continuity between the riser segments while permitting relative pivotal movement between them.

Various techniques, employed to connect long, flexible lengths of belt, cable and filament, to form longer lengths and endless belts are known. The cable loop connector described in U.S. Pat. No. 4,150,906 releasably joins loops located at the ends of cables. The connector carrying a hook, is fastened to a first cable by sliding a tapered portion of the cable through a tapered opening such that the first cable extends beyond the connector and loops back to engage the hook. The loops of adjacent cables so arranged are looped together to connect the cables.

A spiral seam for joining the ends of a Papermaker's fabric is described in U.S. Pat. No. 4,862,926. Yarn is looped over pintles, which also connect coiled members to the yarn, at adjacent ends of the fabric. The coiled members of each fabric are aligned and interleaved mutually with the coiled members at the end of the adjacent fabric. Then another pintle passes through aligned loops formed in the coils to connect the fabrics.

The free ends of belts are connected to make endless belts by passing a pin or link between loops fixed to the belt ends, as shown in U.S. Pat. No. 2,185,563. Belt ends are connected also by fixing to each belt end a clamp having a loop facing the other free end. A bearing having a transverse hole is located within each clamp. Then links, located at opposite lateral sides of the belt and having axially spaced holes, are arranged so that the holes of the links and bearings are aligned. Finally, pintles are inserted through the holes of the links and bearings to connect the belt ends. A device of this type is described in U.S. Pat. No. 2,675,592.

The enormous length and great size of conventional mooring lines and tension legs makes transport and placement of them difficult. Typically they are transported by rail to a shoreline, fitted with flotation gear and towed to the offshore service site. If their weight and bulk could be reduced substantially and their ability to be lengthened and shortened readily could be improved, then they could be assembled to a predetermined length and towed with minimum flotation support to the offshore site.

SUMMARY OF THE INVENTION

A need exists for light weight chain for connecting offshore drilling platforms to the sea floor having strength sufficient to withstand large loads for long periods, improved ease of assembly and disassembly, and tolerance to an underwater environment.

The weight of composite materials in air is one-quarter the weight of steel in air and nearly one-eighth the weight of steel in sea water. Moreover, the tensile strength of composite materials is approximately the same as that of steel. However, the greatest strength of composite materials results when the direction of the fibers is in the direction of the load. Therefore, when the principal load is tensile and directed along the length of a structural member, maximum strength and minimum weight result when the fiber direction is longitudinal. When the chain links are metallic, they can be interconnected by conventional techniques such as those that involve drilling holes through load carrying structural members, aligning the holes and connecting the members by placing a pin in the aligned holes.

This practice is unacceptable where composite materials are used, especially where the fiber direction is unidirectional, because drilling holes severs the highly loaded fibers and requires redistribution of load within the composite matrix adjacent each hole. Furthermore, unidirectional composite material has relatively low shear strength parallel to the fiber direction, which is the mode and directional sense required to transfer load in the matrix between the composite material and connecting pins, if they were used. Therefore, the chain of this invention maximizes the high tensile strength capability of unidirectional fiber composite material and avoids link-to-link attachments that cause large stresses in the composite matrix in directions having inherently low strength.

It is an object of this invention to provide relatively light weight chain of composite material, whose links can be readily assembled and disassembled without compromising strength and weight advantages of the material.

It is another object that the connection between successive links be efficient and compatible with the unique stiffness and strength properties of composite materials. The chain of this invention can be fabricated at low cost by filament winding material and processes that permit use of various combinations of fiber materials and resins to realize the advantages of high strength, stiffness and low cost.

It is a further object that this invention will permit the chain to transition easily to steel chain for use with a tensioning winch located at the water surface.

In realizing these objectives the chain of this invention is fabricated of fiber-reinforced resin composite material. Each link has a terminal loop located at each axial end of a long strap. Loops, located at adjacent ends of successive links, are joined by relatively short connecting links that overlap bushings located within each of the loops. The bushings and connecting links are held in position at each lateral side of the links by pins and washers. A ring surrounds each link where the strap flares to form each terminal loop. The loops of a link may be unitary or in two portions spaced laterally to receive within the space a unitary loop of an adjoining link, aligned axially with the other spaced loops. A pin located within the loops supports washers at each lateral side of the links to maintain the position of the links and to transfer load between the links.

These objects and other objects, features and advantages of the invention are readily apparent from the following detailed description of the best mode for carrying out the invention when taken in connection with the accompanying drawings.

BRIEF DESCRIPTION OF THE DRAWINGS

FIG. 1 is a isometric view illustrating joined links of a composite chain according to the invention, each link having a terminal loop.

FIG. 2 shows, in laterally spaced relationship, the components of the joint that connects the links of FIG. 1.

FIG. 3 is a side view of the assembly of FIG. 1.

FIG. 4 is a cross section taken at plane 4—4 of FIGS. 3 and 7 illustrating a ring surrounding each link.

FIG. 5 is an isometric view illustrating joined links of a composite chain in accordance with the invention, each link having a single looped end and a multiple looped end.

FIG. 6 shows, in laterally spaced relationship, the components that connect the links of FIG. 5, the links being mutually offset longitudinally from their assembled position.

FIG. 7 is a side view of the assembly of FIG. 5.

DESCRIPTION OF THE PREFERRED EMBODIMENT

Referring now to the drawing figures, there is illustrated in FIGS. 1-4 chain links and components for connecting successive links for easy assembly and disassembly. Substantially identical links 10, 11, each up to 100 feet long, are fabricated from composite material, principally epoxy resin reinforced by high strength fibers such as fiberglass or graphite, also called carbon fiber. The load carried by the links is principally tensile; therefore, the reinforcing fiber of the links is predominantly unidirectional and directed longitudinally, parallel to the length of the links. The tensile strength of such unidirectional composite material when loaded in the direction of fibers is approximately the same as that of high strength alloy steel, yet its density is about one-quarter that of steel.

The links are fabricated with filament windings comprising a substantial thickness of unpolymerized or partially polymerized epoxy or other suitable resin containing a matrix of long, thin closely spaced fibers directed substantially along the length of the link. Virtually the entire surface of each fiber is wetted by the resin. Generally, suitable steps are taken to minimize the volume of air entrapped within the composite matrix. The length, width and thickness of the links are determined by the service requirements of the chain, usually by strength, and the shape of the links is determined by the shape of a mold or other form into which the sized filament winding is placed while the resin is unpolymerized and still plastic. Then, the resin is polymerized by heating, thereby solidifying the composite matrix and fixing its shape to that of the mold.

Each link includes a substantially planar, endless strap 12, 13 and two loops 14-17, which flare laterally outward and terminate at cylindrical surfaces 18. Two rings 20 surrounding each strap are located at the points where each strap flares to form the terminal loops. The rings 20, shown in cross section in FIG. 4, include spacers 22 having a flat inner surface contacting the strap and a semicircular outer surface, and an outer winding 24 of composite material such as resin reinforced by fiber glass or graphite fiber. The rings provide against the possibility that the strap might separate at its midplane due to the presence of a component of force directed out of plane at the location of the rings where the loops flare outward from the plane of the strap. The restraint provided by the rings induces a hoop load in the rings; therefore, the principal direction of the reinforcing fiber of the rings is circumferential.

A bushing 26, 28 of steel or composite material, having an outer surface conforming substantially to the inner surface of the loops, is located in each adjacent loop 15, 16 of aligned successive links 10, 11. The outer surface of each bushing comprises first and second arcuate surfaces 27, 29 mutually spaced longitudinal and elongated surfaces 31 located between the first and second arcuate surfaces (FIG. 2). The length of the bushings is longer than the lateral width of the loops and extends beyond each lateral side of the loops. A connecting link 30, 32, preferably of resin reinforced by fiber glass or graphite fibers directed around the circumference of the connecting loops, overlaps the outer surface of the bushings 26 and 28, thereby connecting the bushings and associated loops against outward axial movement. The outer cylindrical surfaces of the loops 15, 16 are located in close mutual proximity, thereby preventing inward relative axial displacement of the loops.

A headed pin 34, 36 carrying a washer 38, 40, adapted to contact the lateral surfaces of the connecting link 30 and bushings 26, 28, extends laterally through each bushing and connecting link 30, 32 and presents a portion of its surface at the opposite lateral side of the links from that of the pin head. There, a washer 42, 44 is placed on each pin close to, or into contact with the adjacent lateral surfaces of the bushings and the connecting link 32. A cotter pin 46, 48 fixed to each pin 34, 36 holds washers 42, 44 against the connecting link 32 and bushings, and prevents displacement of the pins.

FIGS. 5-7 show another embodiment in which each link has a terminal loop 16 of the type described above and, located at the opposite end of the link, two loops 50, 52 spaced laterally and aligned mutually about a lateral axis. The spacing between loops 50, 52 is sufficient to receive between them the single loop 16 of the next link 13.

Connection of links 10 and 11 requires aligning the loops 50, 16, 52 about the lateral axis with loop 16 between the other loops 50 and 52. A headed pin 54 carrying a washer 56, adapted to contact the lateral surfaces of link 50 extends laterally through loops 50, 16, and 52 and presents a portion of its surface at the opposite lateral side of loop 52 from that of the pin head. There, a washer 58 is placed on the pin in contact with the adjacent lateral surface of loop 52. A cotter pin 60, fixed to pin 54, holds the washers against loops 50 and 52 and prevents displacement of the pin.

While the best mode for carrying out the invention has been described in detail, those familiar with the relevant art will recognize various alternative designs and embodiments for practicing the invention defined by the following claims.

What is claimed is:

1. A chain of joined links for supporting or restraining objects, at each joint the chain comprising:
   first and second longitudinally extending links, each link having a loop at each end;
   a first bushing located within the loop of the first link and extending laterally therefrom;
   a second bushing located within the loop of the second link and extending laterally therefrom;
   a first connecting link located at a first lateral side of the loops of the first and second links, contacting the first bushing and second bushing;
   a second connecting link located at a second lateral side of the loops of the first and second links, contacting the first bushing and second bushing;
   a first pin extending laterally through the first bushing, and a second pin extending laterally through the second bushing, each pin carrying blocking surfaces adjacent the first and second connecting links and the first and second bushings; and
   means for securing the position of the pins and limiting movement of the bushings and connecting links mutually and relative to the loops of the first and second links, wherein the links are of composite material having fiber-reinforced plastic resin, the fibers are of the group consisting of fiberglass, carbon and graphite, and the fibers are directed substantially parallel to the length of the links.

2. The chain of claim 1 wherein the first link and second link each comprises:
   a longitudinally extending strap having lateral material width and transverse material thickness;
   a first loop extending longitudinally from the strap in a first direction and a second loop extending longitudinally from the strap in a second direction opposite the first direction, each loop extending transversely outward from the strap, and having a material thickness substantially equal to one-half the material thickness of the strap and a material width substantially the same as that of the strap.

3. The chain of claim 2 wherein the strap is substantially planar and each loop extends transversely outward from the plane of the strap, and further comprising first and second rings surrounding the strap, the first ring located at a juncture of the first loop and the strap, the second ring located at a juncture of the second loop and the strap.

4. A chain of joined links for supporting or restraining objects, at each joint the chain comprising:
   first and second longitudinally extending links, each link having a loop at each end;
   first bushing means located within the loop of the first link for resisting longitudinal movement of the first link relative to the second link;
   second bushing means located within the loop of the second link for resisting longitudinal movement of the second link relative to the first link;
   first means located at a first lateral side of the links for mutually connecting the first bushing means and second bushing means;
   second means located at a second lateral side of the links for mutually connecting the first bushing and the second bushing; and
   pin means extending laterally through the first bushing and second bushing for limiting movement of the bushings and connecting links mutually relative to the loops of the first link and second link, wherein the links are of composite material having fiber-reinforced plastic resin, the fibers are of the group consisting of fiberglass, carbon and graphite, and the fibers are directed substantially parallel to the length of the links.

5. A chain of joined links for carrying tension load between objects restrained by the chain, at each joint the chain comprising:
   first and second longitudinally extending links, each link carrying tension force and having a loop at each end;
   first bushing means located within the loop of the first link for resisting tension force carried by the first link;
   second bushing means located within the loop of the second link for resisting tension force carried by the second link;
   first connecting means located at a first lateral side of the links, overlapping the first and second bushing means, for balancing tension force in the first link and second link;
   a second connecting link located at a second lateral side of the links, overlapping the first and second bushing means, for balancing tension force in the first link and second link; and
   pin means extending laterally through the first bushing means and second bushing means for limiting movement of said first and second bushing means and the connecting links mutually relative to the loops of the first link and second link, wherein the links are of composite material having fiber-reinforced plastic resin, the fibers are of the group consisting of fiberglass, carbon and graphite, and the fibers are directed substantially parallel to the length of the links.

6. A chain link comprising:
   a longitudinally extending, substantially planar strap having lateral material width and transverse material thickness;
   a first loop extending longitudinally from the strap in a first direction and a second loop extending longitudinally from the strap in a second direction opposite the first direction, each loop extending transversely outward from the strap and having a material thickness substantially equal to one-half the material thickness of the strap and a material width substantially the same as that of the strap, the first and second loops having inner arcuate surfaces; and
   first and second rings surrounding the strap, the first ring located at a juncture of the first loop and the strap, the second ring located at a juncture of the second loop and the strap.

7. A chain link comprising:
   a longitudinally extending, substantially planar strap having lateral material width and transverse material thickness;
   a first loop extending longitudinally from the strap in a first direction and a pair of laterally spaced loops extending longitudinally from the strap in a second direction opposite the first direction, each loop extending transversely outward from the strap and having a material thickness substantially equal to one-half the material thickness of the strap, the first loop having a material width substantially the same as that of the strap, the pair of loops having a combined material width substantially the same as that of the strap; and first and second rings surrounding the strap, the first ring located at a juncture of the first loop and the strap, the second ring located at a juncture of the pair of loops and the strap.

8. The chain of claim 7 wherein the links are of composite material having fiber-reinforced plastic resin, the fibers are of the group consisting of fiberglass, carbon and graphite, the fibers being directed substantially parallel to the length of the links.

9. A chain of joined links for supporting or restraining objects, at each joint the chain comprising:

first and second longitudinally extending links, each link having a loop at each end;
a first bushing means located within the loop of the first link and extending laterally therefrom;
a second bushing means located within the loop of the second link and extending laterally therefrom;
a first connecting link located at a first lateral side of the loops of the first and second links, contacting the first bushing and second bushing;
a second connecting link located at a second lateral side of the loops of the first and second links, contacting the first bushing and second bushing;
a first pin extending laterally through the first bushing, and a second pin extending laterally through the second bushing, each pin carrying blocking surfaces adjacent the first and second connecting links and the first and second bushings; and
means for securing the position of the pins and limiting movement of the bushings and connecting links mutually and relative to the loops of the first and second links,
wherein a loop of the first link is longitudinally aligned with a loop of the second link, each bushing having outer surfaces comprising first and second arcuate surfaces mutually spaced longitudinally, and surfaces located between the first and second arcuate surfaces, the loops of the first and second links having inner surfaces conforming to the first arcuate surface, the first and second connecting links having an inner surface overlapping and conforming substantially to the second arcuate surface.

10. A chain of joined links for supporting or restraining objects, at each joint the chain comprising:

first and second longitudinally extending links, each link having a loop at each end;
a first bushing located within the loop of the first link and extending laterally therefrom;
a second bushing located within the loop of the second link and extending laterally therefrom;
a first connecting link located at a first lateral side of the loops of the first and second links, contacting the first bushing and second bushing;
a second connecting link located at a second lateral side of the loops of the first and second links, contacting the first bushing and second bushing;
a first pin extending laterally through the first bushing, and a second pin extending laterally through the second bushing, each pin carrying blocking surfaces adjacent the first and second connecting links and the first and second bushings; and
means for securing the position of the pins and limiting movement of the bushings and connecting links mutually and relative to the loops of the first and second links, said securing and limiting means comprising:

first and second washers carried on the pins, located at said first lateral side between the blocking surfaces of the pins and the bushings and connecting links;
a securing pin carried on each pin, directed laterally thereto and located at said second lateral side; and
third and fourth washers, each carried on a pin, located at said second lateral side between a securing pin and the bushings and connecting links.

11. A chain of joined links for supporting or restraining objects, at each joint the chain comprising:

first and second longitudinally extending links, each link having a loop at each end;
a first bushing means located within the loop of the first link and extending laterally therefrom;
a second bushing located within the loop of the second link and extending laterally therefrom;
a first connecting link located at a first lateral side of the loops of the first and second links, contacting the first bushing and second bushing;
a second connecting link located at a second lateral side of the loops of the first and second links, contacting the first bushing and second bushing;
a first pin extending laterally through the first bushing, and a second pin extending laterally through the second bushing, each pin carrying blocking surfaces adjacent the first and second connecting links and the first and second bushings; and
means for securing the position of the pins and limiting movement of the bushings and connecting links mutually and relative to the loops of the first and second links,
wherein the links are of composite material having fiber-reinforced plastic resin, the fibers are of the group consisting of fiberglass, carbon and graphite, the fibers being directed substantially parallel to the length of the links.

12. A chain of joined links for supporting or restraining objects, at each joint the chain comprising:

first and second longitudinally extending links, each link having a loop at each end;
a first bushing means located within the loop of the first link and extending laterally therefrom;
a second bushing located within the loop of the second link and extending laterally therefrom;
a first connecting link located at a first lateral side of the loops of the first and second links, contacting the first bushing and second bushing;
a second connecting link located at a second lateral side of the loops of the first and second links, contacting the first bushing and second bushing;
a first pin extending laterally through the first bushing, and a second pin extending laterally through the second bushing, each pin carrying blocking surfaces adjacent the first and second connecting links and the first and second bushings; and
means for securing the position of the pins and limiting movement of the bushings and connecting links mutually and relative to the loops of the first and second links,
wherein the links and the first and second connecting links are of composite material having fiber-reinforced plastic resin, the fibers are of the group consisting of fiberglass, carbon and graphite, the fibers being directed substantially parallel to the length of the links.

13. A chain of joined links for supporting or restraining objects, at each joint the chain comprising:

first and second longitudinally extending links, each link having a loop located at a first end and a pair of laterally spaced loops located at a second end, the loop of the first link located between the pair of loops of the second link;

a pin having a laterally directed axis, located within and contacting the loop of the first link and the pair of loops of the second link; and means for securing the position of the pin and limiting movement of the first link relative to the loops of the first and second links, said pin comprising:

first and second arcuate surfaces mutually spaced longitudinally; and surfaces located between the first and second arcuate surfaces, the loop of the first link having an inner surface overlapping and conforming substantially to the first arcuate surface, the pair of loops of the second link having an inner surface overlapping and conforming substantially to the second arcuate surface.

14. A chain of joined links for supporting or restraining objects, at each joint the chain comprising:

first and second longitudinally extending links, each link having a loop located at a first end and a pair of laterally spaced loops located at a second end, the loop of the first link located between the pair of loops of the second link;

a pin having a laterally directed axis, located within and contacting the loop of the first link and the pair of loops of the second link, said pin having a blocking surface thereon; and means for securing the position of the pin and limiting movement of the first link relative to the loops of the first and second links, said securing and limiting means comprising:

first and second washers carried on the pin, the first washer located at a first lateral side between the blocking surface and one of the pair of loops of the second link, the second washer located at a second lateral side adjacent the other of the pair of loops of the second link; and securing means for limiting movement of the pin.

15. A chain of joined links for supporting or restraining objects, at each joint the chain comprising:

first and second longitudinally extending links, each link having a loop located at a first end and a pair of laterally spaced loops located at a second end, the loop of the first link located between the pair of loops of the second link;

a pin having a laterally directed axis, located within and contacting the loop of the first link and the pair of loops of the second link; and means for securing the position of the pin and limiting movement of the first link relative to the loops of the first and second links, wherein the first and second links each comprising:

a longitudinally extending strap having lateral width and transverse thickness;

a first loop extending longitudinally from the strap in a first direction and a pair of laterally spaced loops extending longitudinally from the strap in a second direction opposite the first direction, each loop extending transversely outward from the strap and having a thickness substantially equal to one-half the thickness of the strap, the first loop having a width substantially the same as that of the strap, the pair of loops having a combined width substantially the same as that of the strap.

16. The chain of claim 15 wherein the strap is substantially planar and each loop extends transversely outward from the plane of the strap, and further comprising first and second rings surrounding the strap, the first ring located at a juncture of the first loop and the strap, the second ring located at a juncture of the pair of loops and the strap.

17. A chain link comprising:

a longitudinally extending, substantially planar strap having lateral width and transverse thickness;

a first loop extending longitudinally from the strap in a first direction and a second loop extending longitudinally from the strap in a second direction opposite the first direction, each loop extending transversely outward from the strap having a thickness substantially equal to one-half the thickness of the strap and a width substantially the same as that of the strap, the first and second loops having inner arcuate surfaces; and first and second rings surrounding the strap, the first ring located at a juncture of the first loop and the strap, the second ring located at a juncture of the second loop and the strap, wherein the links are of composite material having fiber-reinforced plastic resin, the fibers are of the group consisting of fiberglass, carbon and graphite, the fibers being directed substantially parallel to the length of the links.

* * * * *